US008631201B2

(12) United States Patent
Koshiyama

(10) Patent No.: US 8,631,201 B2
(45) Date of Patent: Jan. 14, 2014

(54) DYNAMIC ALLOCATION OF VIRTUALIZATION FUNCTION TYPES TO RAID LEVELS

(75) Inventor: Yuichi Koshiyama, Kahoku (JP)

(73) Assignee: Fujitsu Limited, Kawasaki (JP)

( * ) Notice: Subject to any disclaimer, the term of this patent is extended or adjusted under 35 U.S.C. 154(b) by 338 days.

(21) Appl. No.: 13/064,421

(22) Filed: Mar. 23, 2011

(65) Prior Publication Data
US 2012/0005425 A1 Jan. 5, 2012

(30) Foreign Application Priority Data

Jun. 30, 2010 (JP) .................................. 2010-150427

(51) Int. Cl.
*G06F 12/00* (2006.01)
(52) U.S. Cl.
USPC .......................................................... 711/114
(58) Field of Classification Search
USPC .......................................................... 711/114
See application file for complete search history.

(56) References Cited

U.S. PATENT DOCUMENTS

| 5,542,065 A * | 7/1996 | Burkes et al. ................. 711/114 |
| 6,076,142 A * | 6/2000 | Corrington et al. ........... 711/114 |
| 7,702,948 B1 * | 4/2010 | Kalman et al. ................. 714/5.1 |
| 2002/0184442 A1 * | 12/2002 | Veitch et al. ................... 711/114 |
| 2004/0133743 A1 * | 7/2004 | Ito et al. ......................... 711/114 |
| 2005/0172097 A1 * | 8/2005 | Voigt et al. .................... 711/170 |
| 2006/0047906 A1 | 3/2006 | Umemura |
| 2008/0071984 A1 * | 3/2008 | Araki et al. ................... 711/114 |
| 2008/0209253 A1 * | 8/2008 | Sheppard et al. ................ 714/1 |
| 2010/0235602 A1 * | 9/2010 | Chan ............................. 711/170 |

FOREIGN PATENT DOCUMENTS

| JP | 2003-296154 | 10/2003 |
| JP | 2006-065709 | 3/2006 |

* cited by examiner

*Primary Examiner* — Aimee Li
*Assistant Examiner* — Kenneth Tsang
(74) *Attorney, Agent, or Firm* — Staas & Halsey LLP

(57) ABSTRACT

A storage control program causes a computer to execute a RAID level acquisition unit, a mapping unit, and a mapping information storage unit therein. The RAID level acquisition unit acquires RAID levels, supportable by a storage device including a plurality of storage mediums, from the storage device. The mapping unit maps the function types of a storage virtualization function in a host device accessing the storage device on the respective RAID levels acquired by the RAID level acquisition unit. The mapping information storage unit stores the correspondence relationship between the RAID levels and the function types mapped by the mapping unit as mapping information.

9 Claims, 17 Drawing Sheets

FIG.3

| RAID LEVEL / VDS_LUN_TYPE | 0 | 1 | 5 | 6 | 0+1 | 0+5 | 0+6 | 1+0 | 1+5 | 5+0 | 5+1 | 5+5 | 5+6 | 6+0 | 6+1 | 6+5 | 6+6 |
|---|---|---|---|---|---|---|---|---|---|---|---|---|---|---|---|---|---|
| VDS_LT_MIRROR | 4 | 1 | 4 | 4 | 2 | 4 | 4 | 2 | 1 | 4 | 2 | 4 | 4 | 4 | 2 | 4 | 4 |
| VDS_LT_STRIPE | 1 | 4 | 4 | 4 | 1 | 1 | 1 | 1 | 4 | 2 | 4 | 4 | 4 | 2 | 4 | 4 | 4 |
| VDS_LT_PARITY | 4 | 4 | 1 | 4 | 4 | 2 | 2 | 4 | 2 | 1 | 1 | 1 | 1 | 3 | 3 | 2 | 2 |
| VDS_LT_SPAN | 4 | 4 | 4 | 1 | 4 | 3 | 3 | 4 | 3 | 3 | 3 | 2 | 2 | 1 | 1 | 1 | 1 |

PRIORITY FOR EACH RAID LEVEL

FIG.4

| RAID DEVICE A (192.168.10.xx) | | |
|---|---|---|
| VDS_LUN_TYPE | RAID LEVEL (PRIMARY) | RAID LEVEL (SECONDARY) |
| VDS_LT_MIRROR | RAID1 | |
| VDS_LT_STRIPE | RAID1+0 | RAID0 |
| VDS_LT_PARITY | RAID5 | |
| VDS_LT_SPAN | RAID6 | |

FIG.5

PRIORITY FOR EACH RAID LEVEL

| RAID LEVEL<br>VDS_LUN_TYPE | 0 | 1 | 5 | 6 | 0+1 | 0+5 | 0+6 | 1+0 | 1+5 | 5+0 | 5+1 | 5+5 | 5+6 | 6+0 | 6+1 | 6+5 | 6+6 |
|---|---|---|---|---|---|---|---|---|---|---|---|---|---|---|---|---|---|
| VDS_LT_MIRROR | 4 | 1 | 4 | 4 | 2 | 4 | 4 | 2 | 1 | 4 | 2 | 4 | 4 | 4 | 2 | 4 | 4 |
| VDS_LT_STRIPE | 1 | 4 | 4 | 4 | 1 | 1 | 1 | 1 | 4 | 2 | 4 | 4 | 4 | 2 | 4 | 4 | 4 |
| VDS_LT_PARITY | 4 | 4 | 1 | 4 | 4 | 2 | 2 | 4 | 2 | 1 | 1 | 1 | 1 | 3 | 3 | 2 | 2 |
| VDS_LT_SPAN | 4 | 4 | 4 | 1 | 4 | 3 | 3 | 4 | 3 | 3 | 3 | 2 | 2 | 1 | 1 | 1 | 1 |

FIG.6

| RAID LEVEL / VDS_LUN_TYPE | 0 | 1 | 5 | 6 | 0+1 | 0+5 | 0+6 | 1+0 | 1+5 | 5+0 | 5+1 | 5+5 | 5+6 | 6+0 | 6+1 | 6+5 | 6+6 |
|---|---|---|---|---|---|---|---|---|---|---|---|---|---|---|---|---|---|
| VDS_LT_MIRROR | 4 | 1 | 4 | 4 | 2 | 4 | 4 | 2 | 1 | 4 | 2 | 4 | 4 | 4 | 2 | 4 | 4 |
| VDS_LT_STRIPE | 1 | 4 | 4 | 4 | 1 | 1 | 1 | 1 | 4 | 2 | 4 | 4 | 4 | 2 | 4 | 4 | 4 |
| VDS_LT_PARITY | 4 | 4 | 1 | 4 | 4 | 2 | 2 | 4 | 2 | 1 | 1 | 1 | 1 | 3 | 3 | 2 | 2 |
| VDS_LT_SPAN | 4 | 4 | 4 | 1 | 4 | 3 | 3 | 4 | 3 | 3 | 3 | 2 | 2 | 1 | 1 | 1 | 1 |

PRIORITY FOR EACH RAID LEVEL

FIG.10A

BEFORE CHANGE

| RAID DEVICE A (192.168.10.xx) | | |
|---|---|---|
| VDS_LUN_TYPE | RAID LEVEL (PRIMARY) | RAID LEVEL (SECONDARY) |
| VDS_LT_MIRROR | RAID 1 | |
| VDS_LT_STRIPE | RAID 1+0 | RAID 0 |
| VDS_LT_PARITY | RAID 5 | |
| VDS_LT_SPAN | RAID 6 | |

FIG.10B

AFTER CHANGE

| RAID DEVICE A (192.168.10.xx) | | |
|---|---|---|
| VDS_LUN_TYPE | RAID LEVEL (PRIMARY) | RAID LEVEL (SECONDARY) |
| VDS_LT_MIRROR | RAID 1 | RAID 1+0 |
| VDS_LT_STRIPE | RAID 0 | |
| VDS_LT_PARITY | RAID 5 | RAID 5+0 |
| VDS_LT_SPAN | RAID 6 | |

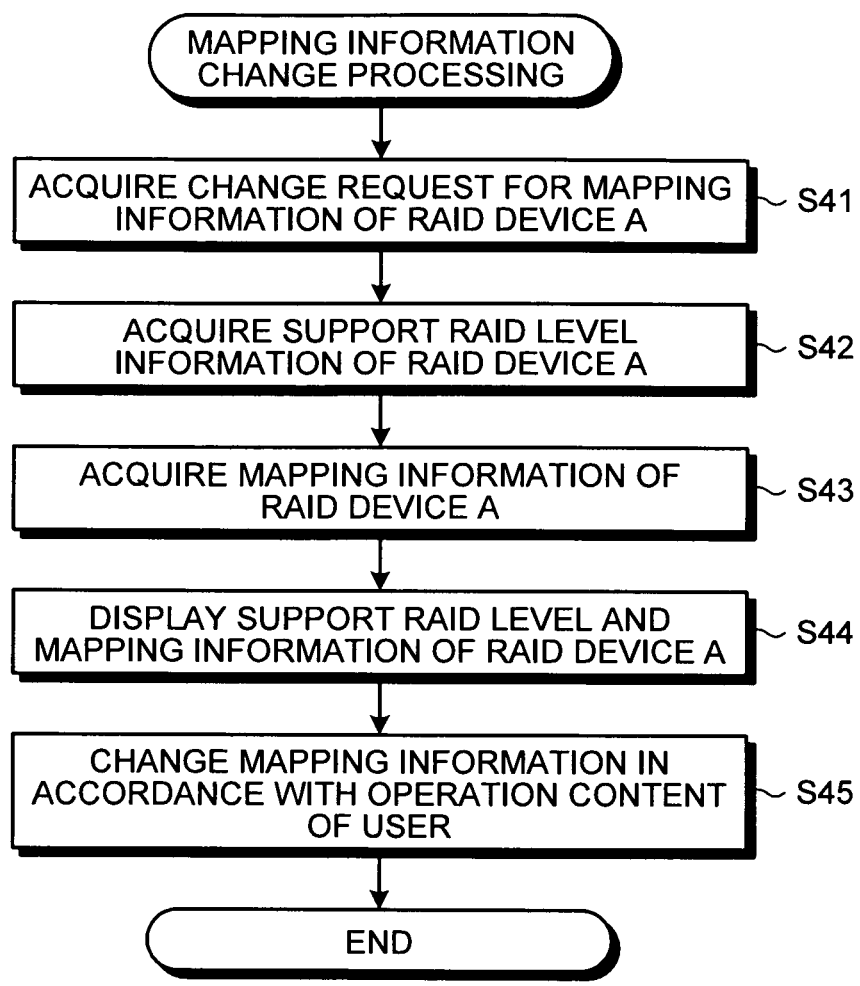

DYNAMIC ALLOCATION OF VIRTUALIZATION FUNCTION TYPES TO RAID LEVELS

CROSS-REFERENCE TO RELATED APPLICATION

This application is based upon and claims the benefit of priority of the prior Japanese Patent Application No. 2010-150427, filed on Jun. 30, 2010, the entire contents of which are incorporated herein by reference.

FIELD

The embodiments discussed herein are directed to a storage system and a storage control method.

BACKGROUND

An Operation System (OS) is provided with a function of virtualizing a storage device. For example, in a Windows (Registered Trademark) server, Virtual Disk Service (VDS) is used. The storage device is also provided with a virtualization function. For example, a Redundant Array of Independent Disks (RAID) device is known.

There is software which associates a RAID device with a VDS used in a Windows server. This software is called VDS Hardware Provider (VDSHP). The VDSHP is mounted in the Windows server such that storage management software which is supported by the Windows OS can set the configuration of the RAID device, such as Logical Unit Number (LUN) or affinity, by using the VDSHP.

The VDS determines VDS_LUN_TYPE as a definition value representing the type of LUN. The definition values do not correspond to RAID levels one to one. The VDSHP stores the definition values of VDS_LUN_TYPE in mapping information in association with the RAID levels which are supported by the RAID device. A RAID device control unit which controls the RAID device sets the LUN in the RAID device with reference to the mapping information.

For example, a case where stripe LUN is set in the RAID device from the server as an example of VDS_LUN_TYPE will be described with reference to FIG. 17. FIG. 17 is a diagram illustrating a case where a stripe LUN is created in the related art. First, in a server 100, storage management software 101 acquires a stripe-designate LUN creation request (a1). When this happens, the storage management software 101 requests a VDSHP 102 to create LUN with VDS_LT_STRIPE, which is one of the definition values of VDS_LUN_TYPE, as a parameter (a2). Then, the VDSHP 102 activates a RAID device control unit 103. Next, the RAID device control unit 103 refers to mapping information 105 stored in a mapping information storage unit 104 (a3) and extracts the RAID level associated with VDS_LT_STRIPE. It is assumed that the RAID level associated with VDS_LT_STRIPE is RAID1+0.

Subsequently, the RAID device control unit 103 issues to a RAID device 200 a LUN creation command with the extracted RAID level, that is, RAID1+0 as a parameter (a4). Thereafter, in the RAID device 200, a RAID configuration information change unit 201 changes RAID configuration information 203 stored in a RAID configuration information storage unit 202 to set LUN on RAID1+0.

A technique is known in which, when VDS is not embedded in the server, mapping information which represents the correspondence relationship between the logical volume of a RAID device and the logical volume of an external storage device is stored in the server, and the external storage device and the RAID device are managed uniformly.

However, the VDS may not support some of the RAID levels. As an example, it is impossible to associate all the RAID levels supported by the RAID device with the definition values of VDS_LUN_TYPE defined by the VDS, thus the VDS does not support the RAID level which cannot be associated with the definition values. That is, in the mapping information, the definition value "VDS_LT_SPAN" of VDS_LUN_TYPE is associated with RAID6, and the definition value "VDS_LT_PARITY" is associated with RAID5. The definition value "VDS_LT_MIRROR" is associated with RAID1, and the definition value "VDS_LT_STRIPE" is associated with RAID1+0. On the other hand, RAID0 or RAID5+0 is not associated with the definition value of VDS_LUN_TYPE, thus the VDS does not support RAID0 or RAID5+0.

As another example, as described above, in the mapping information, the correspondence relationship between the definition values of VDS_LUN_TYPE and the RAID levels is fixed, so that it may be impossible to dynamically change the mapping information. For this reason, when a RAID level is added to the RAID device, it may be impossible to change the mapping information in accordance with the addition of the RAID level. That is, the VDS does not support the added RAID level.

Patent Document 1: Japanese Laid-open Patent Publication No. 2006-65709
Patent Document 2: Japanese Laid-open Patent Publication No. 2003-296154

SUMMARY

According to an aspect of an embodiment of the invention, a storage system includes a storage device that includes a plurality of storage mediums; and a host device that accesses the storage device. The host device includes a RAID level acquisition unit that acquires RAID levels supportable by the storage device from the storage device; a mapping unit that maps the function types of a storage virtualization function in the host device on the respective RAID levels acquired by the RAID level acquisition unit; and a mapping information storage unit that stores a correspondence relationship between the RAID levels and the function types mapped by the mapping unit as mapping information.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of the data structure of a generation rule table;

FIG. 4 is a diagram illustrating an example of the data structure of mapping information;

FIG. 5 is an explanatory view illustrating a specific example of mapping information generation;

FIG. 6 is an explanatory view illustrating another specific example of mapping information;

FIGS. 10A and 10B depict a specific example of mapping information change;

FIG. 11 is a flowchart illustrating a procedure of mapping information change processing according to the third embodiment;

DESCRIPTION OF EMBODIMENTS

Preferred embodiments of the present invention will be explained with reference to accompanying drawings. It should be noted that the invention is not limited to the examples.

[a] First Embodiment

Figure 1:
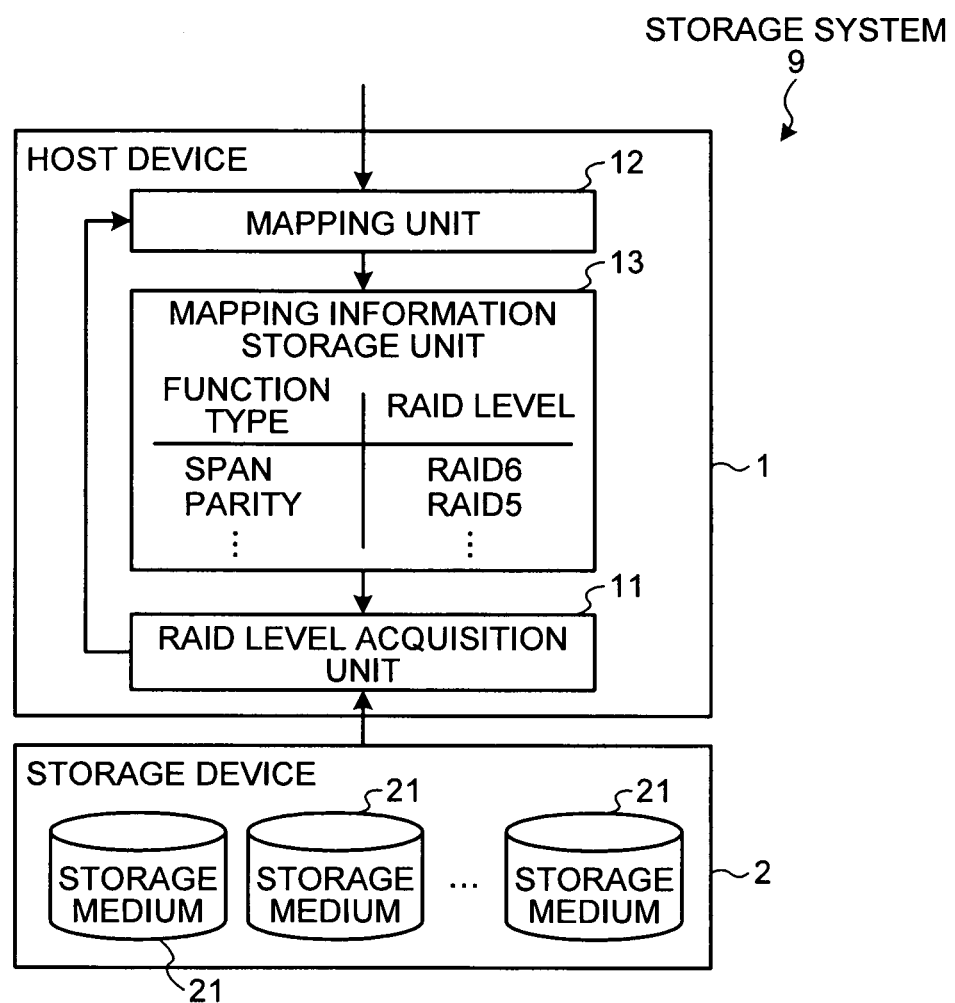
FIG. 1 is a functional block diagram illustrating the configuration of a storage system according to a first embodiment.

FIG. 1 is a functional block diagram illustrating the configuration of a storage system according to a first embodiment. As illustrated in FIG. 1, a storage system 9 includes a host device 1 and a storage device 2. The host device 1 includes a RAID level acquisition unit 11, a mapping unit 12, and a mapping information storage unit 13.

The RAID level acquisition unit 11 acquires Redundant Arrays of Inexpensive Disks (RAID) levels, which can be supported by the storage device 2, from the storage device 2 including a plurality of storage mediums 21.

The mapping unit 12 maps the function type of the storage virtualization function in the host device 1 accessing the storage device 2 on each RAID level acquired by the RAID level acquisition unit 11.

The mapping information storage unit 13 stores the correspondence relationship between the RAID levels and the function types mapped by the mapping unit 12 as mapping information.

In such a manner, the storage system 9 maps the function type of the storage virtualization function in the host device 1 on each RAID level which can be supported by the storage device 2 and stores the correspondence relationship between the RAID levels and the function types as mapping information. For this reason, the storage system 9 can support all the RAID levels, which can be supported by the storage device 2, by the storage virtualization function in the host device 1 by using the function type stored as the mapping information in virtualizing the RAID levels.

On the other hand, as the host device 1 of the storage system 9 according to the first embodiment, for example, a Windows server is used. When a Windows server is used as the host device 1, Virtual Disk Service (VDS) is used as the storage virtualization function in the Windows server accessing the storage device 2. In a second embodiment and later, a storage system will be described in which a Windows server (hereinafter, simply referred to as "server") is used as the host device 1 and the VDS is used as the storage virtualization function.

[b] Second Embodiment

Configuration of Storage System According to Second Embodiment

Figure 2:
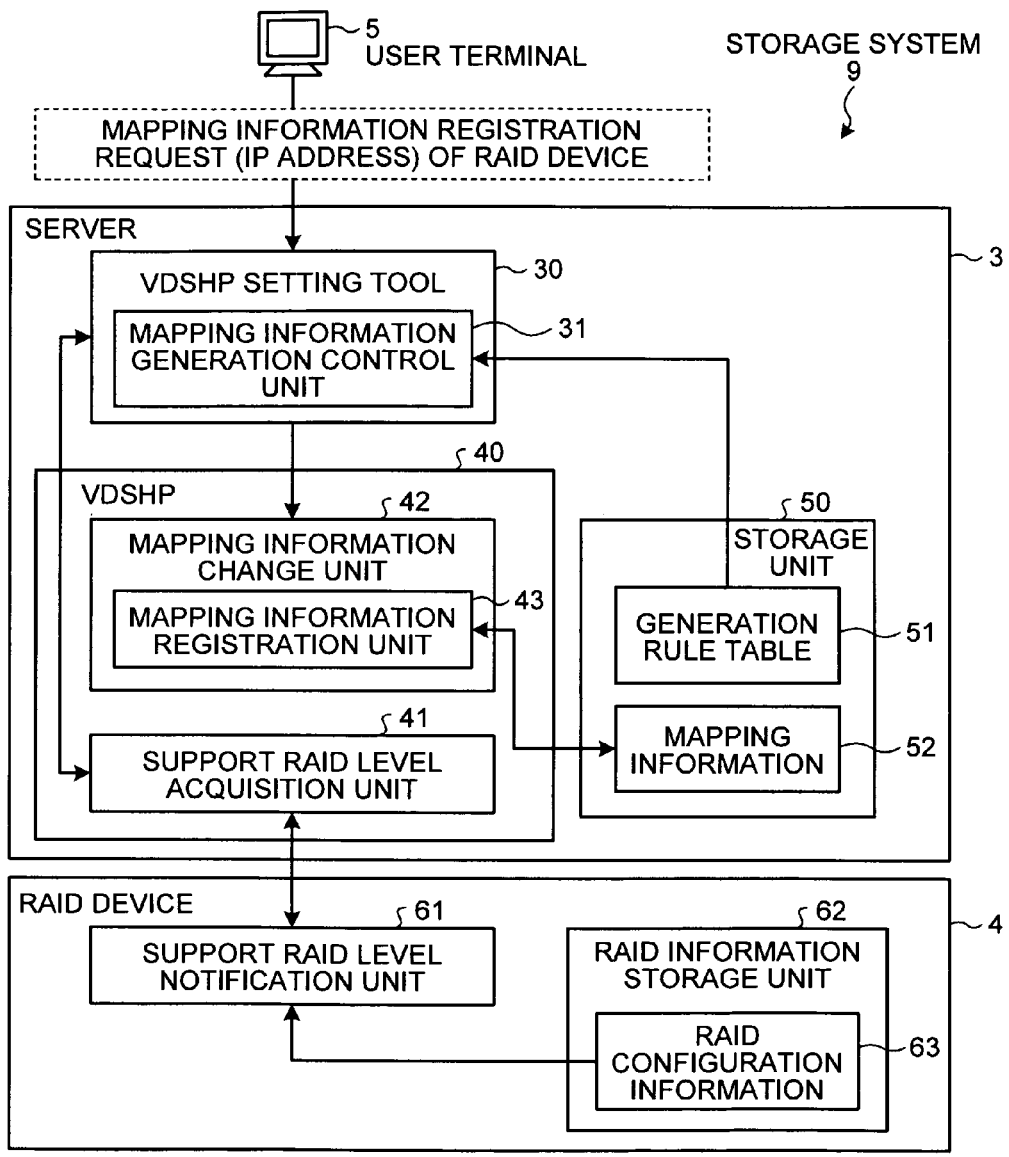
FIG. 2 is a functional block diagram illustrating the configuration of a storage system according to a second embodiment.

FIG. 2 is a functional block diagram illustrating the configuration of the storage system 9 according to the second embodiment. As illustrated in FIG. 2, the storage system 9 has a server 3 and a RAID device 4. The server 3 has a VDS Hardware Provider (VDSHP) setting tool 30, a VDSHP 40, and a storage unit 50. The VDSHP 40 is software which associates the RAID device 4 with the VDS, and has a support RAID level acquisition unit 41 and a mapping information change unit 42. The VDSHP setting tool 30 is software which sets the RAID device 4 as the control target of the VDSHP, and has a mapping information generation control unit 31. The storage unit 50 has a generation rule table 51 and mapping information 52. The storage unit 50 is, for example, a semiconductor memory device, such as a Random Access Memory (RAM) or a flash memory, or a storage device, such as a hard disk or an optical disk.

The RAID device 4 has a support RAID level notification unit 61 and a RAID information storage unit 62. The RAID information storage unit 62 has RAID configuration information 63 which stores the RAID configuration of the RAID device 4. The RAID information storage unit 62 is, for example, a semiconductor memory device, such as a Random Access Memory (RAM) or a flash memory, or a storage device, such as a hard disk or an optical disk.

The mapping information generation control unit 31 maps the LUN type defined by the VDS on each RAID level supported by the RAID device 4. Specifically, the mapping information generation control unit 31 requests the support RAID level acquisition unit 41 to acquire the RAID levels which are supported by the RAID device 4 and acquires the requested RAID levels from the support RAID level acquisition unit 41. The mapping information generation control unit 31 references the generation rule table 51 which stores the mapping generation rules of the LUN type on each RAID level and maps the LUN type on each RAID level acquired from the support RAID level acquisition unit 41.

The generation rule table 51 will now be described with reference to FIG. 3. FIG. 3 is a diagram illustrating an example of the data structure of the generation rule table. As illustrated in FIG. 3, the generation rule table 51 stores the definition value of VDS_LUN_TYPE (hereinafter, referred to as "LUN type") 51a in association with the priority 51c of each RAID level 51b. That is, the generation rule table 51 stores each RAID level 51b while allocating the priority 51c when being mapped on the definition value of the LUN type 51a. With regard to the priority 51c corresponding to the LUN type 51a for each RAID level 51b, the setting may be appropriately changed.

As the LUN type 51a, there are four definition values of VDS_LT_MIRROR (mirror type), VDS_LT_STRIPE (stripe type), VDS_LT_PARITY (stripe type), and VDS_LT_SPAN (span type). As the RAID level 51b, there are 17 RAID levels of RAID0, RAID1, RAID5, . . . , and RAID6+6 from left to right illustrated in FIG. 3.

For example, as indicated by reference numeral r1, when the RAID level 51b is RAID0, the value of the priority 51c which is associated with the definition value VDS_LT_STRIPE of the LUN type 51a is "1", and the value of the priority 51c which is associated with other definition values is "4". As indicated by reference numeral r2, when the RAID level 51b is RAID5+0, the value of the priority 51c which is associated with the definition value VDS_LT_PARITY of the LUN type 51a is "1". The value of the priority 51c becomes "2", "3", and "4" in order of VDS_LT_STRIPE, VDS_LT_SPAN, and VDS_LT_MIRROR, respectively.

Returning to FIG. 2, specifically, each time the LUN type 51a is mapped on the RAID level 51b, the mapping information generation control unit 31 increments a counter corresponding to the mapped LUN type 51a by 1. The counter is provided for each LUN type 51a in the storage unit 50, and stores the number of RAID levels which are already mapped for each LUN type 51a. The mapping information generation control unit 31 selects one RAID level or two or more RAID levels acquired from the support RAID level acquisition unit 41 in a predetermined sequence. The mapping information generation control unit 31 selects the LUN type 51a in an ascending order of the priority 51c for the selected RAID level. The mapping information generation control unit 31 determines whether or not the value of the counter corresponding to the selected LUN type 51a is greater than the value of the counter corresponding to another LUN type 51a by equal to or greater than a predetermined number (for example, "2").

When the value of the counter corresponding to the LUN type 51a is not greater than the value of the counter corresponding to another LUN type 51a by equal to or greater than the predetermined number, the mapping information generation control unit 31 determines that mapping does not concentrate on the LUN type 51a. The mapping information generation control unit 31 maps the LUN type 51a on the RAID level. When the value of the counter corresponding to the LUN type 51a is greater than the value of the counter corresponding to another LUN type 51a by equal to or greater than the predetermined number, the mapping information generation control unit 31 determines that mapping concentrates on the LUN type 51a. The mapping information generation control unit 31 selects the LUN type 51a having the next smallest priority and performs mapping generation processing in accordance with the mapping generation rules. The mapping information generation control unit 31 notifies the mapping information change unit 42 of a request to register the mapping information with the LUN type 51a mapped on all the RAID levels acquired from the support RAID level acquisition unit 41.

The mapping information change unit 42 changes the mapping information 52 in accordance with the content requested by the VDSHP setting tool 30. The mapping information change unit 42 also has a mapping information registration unit 43.

If the request to register mapping information is acquired from the mapping information generation control unit 31, the mapping information registration unit 43 registers the mapping of the RAID levels and the LUN types generated by the mapping generation processing of the mapping information generation control unit 31 in the mapping information 52. The mapping information 52 will be described with reference to FIG. 4. FIG. 4 is a diagram illustrating an example of the data structure of mapping information. As illustrated in FIG. 4, the mapping information 52 stores a primary RAID level 52c and a secondary RAID level 52d in association with a LUN type 52b. That is, in the mapping information 52, two RAID levels are associated with one LUN type 52b. In the example of FIG. 4, when the LUN type 52b is VDS_LT_STRIPE, RAID1+0 and RAID0 are associated with VDS_LT_STRIPE.

The mapping information 52 stores an IP address 52a allocated to the RAID device as a header. That is, the mapping information 52 is provided for each RAID device. Although the mapping information 52 has been described in which two RAID levels 52d are associated with one LUN type 52b, the invention is not limited thereto, and two or more RAID levels 52d may be associated with one LUN type 52b.

The support RAID level acquisition unit 41 acquires the RAID levels which can be supported by the RAID device 4. Specifically, the support RAID level acquisition unit 41 acquires a request to acquire the RAID levels to be supported by the RAID device 4 from the mapping information generation control unit 31. The support RAID level acquisition unit 41 issues a RAID level acquisition command to the RAID device 4 and acquires the RAID levels to be supported by the RAID device 4. The support RAID level acquisition unit 41 notifies the mapping information generation control unit 31 of the acquired RAID levels.

The support RAID level notification unit 61 notifies the VDSHP 40 of the RAID levels which can be supported by the RAID device 4. Specifically, if a RAID level acquisition command issued from the support RAID level acquisition unit 41 is received, the support RAID level notification unit 61 acquires the RAID levels to be supported by the RAID device 4 with reference to the RAID configuration information 63. The support RAID level notification unit 61 notifies the support RAID level acquisition unit 41 of the acquired RAID levels.

A user terminal 5 is connected to the server 3 and notifies the server 3 of various requests. For example, the user terminal 5 notifies the VDSHP setting tool 30 of the request to register mapping information with the IP address of the RAID device 4 as a parameter. The user terminal 5 also acquires the result of the notified request and displays the acquired result.

Specific Example of Mapping Information Generation

Next, a specific example of mapping information generation by the mapping information generation control unit 31 will be described with reference to FIG. 5. FIG. 5 is an explanatory view illustrating a specific example of mapping information generation. It is assumed that the RAID levels which can be supported by the RAID device 4 are set to 0, 1, 5, 6, 1+0, and 5+0, and description will be provided using the generation rule table 51. It is also assumed that the counter provided for each LUN type 51a in the storage unit 50 stores "0" in advance. It is also assumed that the values of the respective counters are expressed by (0,0,0,0) in order of the VDS_LT_MIRROR, VDS_LT_STRIPE, VDS_LT_PARITY, and VDS_LT_SPAN representing the LUN type 51a. Hereinafter, VDS_LT_MIRROR, VDS_LT_STRIPE, VDS_LT_STRIPE, and VDS_LT_SPAN are simply referred to as "MIRROR", "STRIPE", "PARITY", and "SPAN", respectively.

First, the mapping information generation control unit 31 selects the RAID level "0". The mapping information generation control unit 31 selects the LUN type 51a in an ascending order of the priority 51c for the selected RAID level "0". Here, "STRIPE" corresponding to the priority 1 which is the smallest value of the priority 51c is selected. Since the value of each counter of the LUN type 51a is "0", the mapping information generation control unit 31 determines that the value of the counter corresponding to selected "STRIPE" is not greater than the value of the counter of another LUN type 51a by equal to or greater than 2. The mapping information generation control unit 31 maps "STRIPE" on the RAID level "0" and increments the counter corresponding to "STRIPE" by 1. As a result, the values of the respective counters become (0,1,0,0).

Next, the mapping information generation control unit 31 selects the RAID level "1". The mapping information generation control unit 31 selects the LUN type 51a in an ascending order of the priority 51c for the selected RAID level "1". Here, "MIRROR" corresponding to the priority 1 which is the smallest value of the priority 51c is selected. Since the values of the respective counters are (0,1,0,0), the mapping information generation control unit 31 determines that the value of the counter corresponding to selected "MIRROR" is not greater than the value of the counter corresponding to another LUN type 51a by equal to or greater than 2. The mapping information generation control unit 31 maps "MIRROR" on the RAID level "1" and increments the counter corresponding to "MIRROR" by 1. As a result, the values of the respective counters become (1,1,0,0).

Similarly, the mapping information generation control unit 31 maps "PARITY" corresponding to the priority 1 on the RAID level "5" on the basis of the values of the respective counters and increments the counter corresponding to the "PARITY" by 1. As a result, the values of the respective counters become (1,1,1,0).

The mapping information generation control unit 31 maps "SPAN" corresponding to the priority 1 on the RAID level "6" on the basis of the values of the respective counters and increments the counter corresponding to "SPAN" by 1. As a result, the values of the respective counters become (1,1,1,1).

The mapping information generation control unit 31 also maps "STRIPE" corresponding to the priority 1 on the RAID level "1+0" on the basis of the values of the respective counters and increments the counter corresponding to "STRIPE" by 1. As a result, the values of the respective counters become (1,2,1,1).

The mapping information generation control unit 31 maps "PARITY" corresponding to the priority 1 on the RAID level "5+0" on the basis of the values of the respective counters and increments the counter corresponding to "PARITY" by 1. As a result, the values of the respective counters become (1,2,2,1). In such a manner, the mapping information generation control unit 31 maps the LUN type of the priority 1 on each RAID level.

Another Specific Example of Mapping Information Generation

Next, another specific example of mapping information generation by the mapping information generation control unit 31 will be described with reference to FIG. 6. FIG. 6 is an explanatory view illustrating another specific example of mapping information generation. It is assumed that the RAID levels which can be supported by the RAID device 4 are set to 0, 1, 5, 0+1, 0+5, 1+0, 1+5, 5+0, 5+1, and 5+5, and description will be provided using the generation rule table 51.

The RAID levels "0", "1", "5", and "0+1" which are mapped on the LUN type 51a corresponding to the priority 1 are the same as described in the mapping information generation of FIG. 5, thus description thereof will be omitted. It is assumed that the counter provided for each LUN type 51a stores a value after mapping on the RAID level "0+1", and the values of the respective counters are expressed by (1,2,1,0) in order of "MIRROR", "STRIPE", "PARITY", and "SPAN".

Following the mapping on the RAID level "0+1", the mapping information generation control unit 31 selects the RAID level "0+5". The mapping information generation control unit 31 selects the LUN type 51a in an ascending order of the priority 51c for the selected RAID level "0+5". Here, the mapping information generation control unit 31 selects "STRIPE" corresponding to the priority 1 which is the smallest value of the priority 51c. The mapping information generation control unit 31 determines that the value of the counter corresponding to selected "STRIPE" is greater than the value of the counter corresponding to another LUN type 51a by equal to or greater than 2. That is, since the values of the respective counters are (1,2,1,0), the counter value corresponding to selected "STRIPE" is "2", and the counter value corresponding to "SPAN" is "0", it is determined that the counter value corresponding to "STRIPE" is greater than the counter value corresponding to "SPAN" by equal to or greater than 2. As a result, the mapping information generation control unit 31 determines the mapping concentrates on "STRIPE" and selects "PARITY" corresponding to the priority 2. The mapping information generation control unit 31 determines that the value of the counter corresponding to selected "PARITY" is not greater than the value of the counter corresponding to another LUN type 51a by equal to or greater than 2. That is, since the counter value corresponding to selected "PARITY" is "1", and the counter values corresponding to another LUN type 51a are "1", "2", and "0", it is determined that the counter value corresponding to "STRIPE" is not greater than the counter value corresponding to another LUN type 51a by equal to or greater than 2. The mapping information generation control unit 31 maps "PARITY" corresponding to the priority 2 on the RAID level "0+5" and increments the counter corresponding to "PARITY" by 1. As a result, the values of the respective counters become (1,2,2,0).

Similarly, the mapping information generation control unit 31 maps "MIRROR" corresponding to the priority 2 on the RAID level "1+0" on the basis of the values of the respective counters and increments the counter corresponding to the "MIRROR" by 1. As a result, the values of the respective counters become (2,2,2,0).

The mapping information generation control unit 31 also maps "SPAN" corresponding to the priority 3 on the RAID level "1+5" on the basis of the values of the respective counters and increments the counter corresponding to "SPAN" by 1. As a result, the values of the respective counters become (2,2,2,1).

Subsequently, the mapping information generation control unit 31 maps the corresponding LUN type 51a on each of the RAID levels "5+0", "5+1", and "5+5" in that order on the basis of the values of the respective counters.

Figure 7:
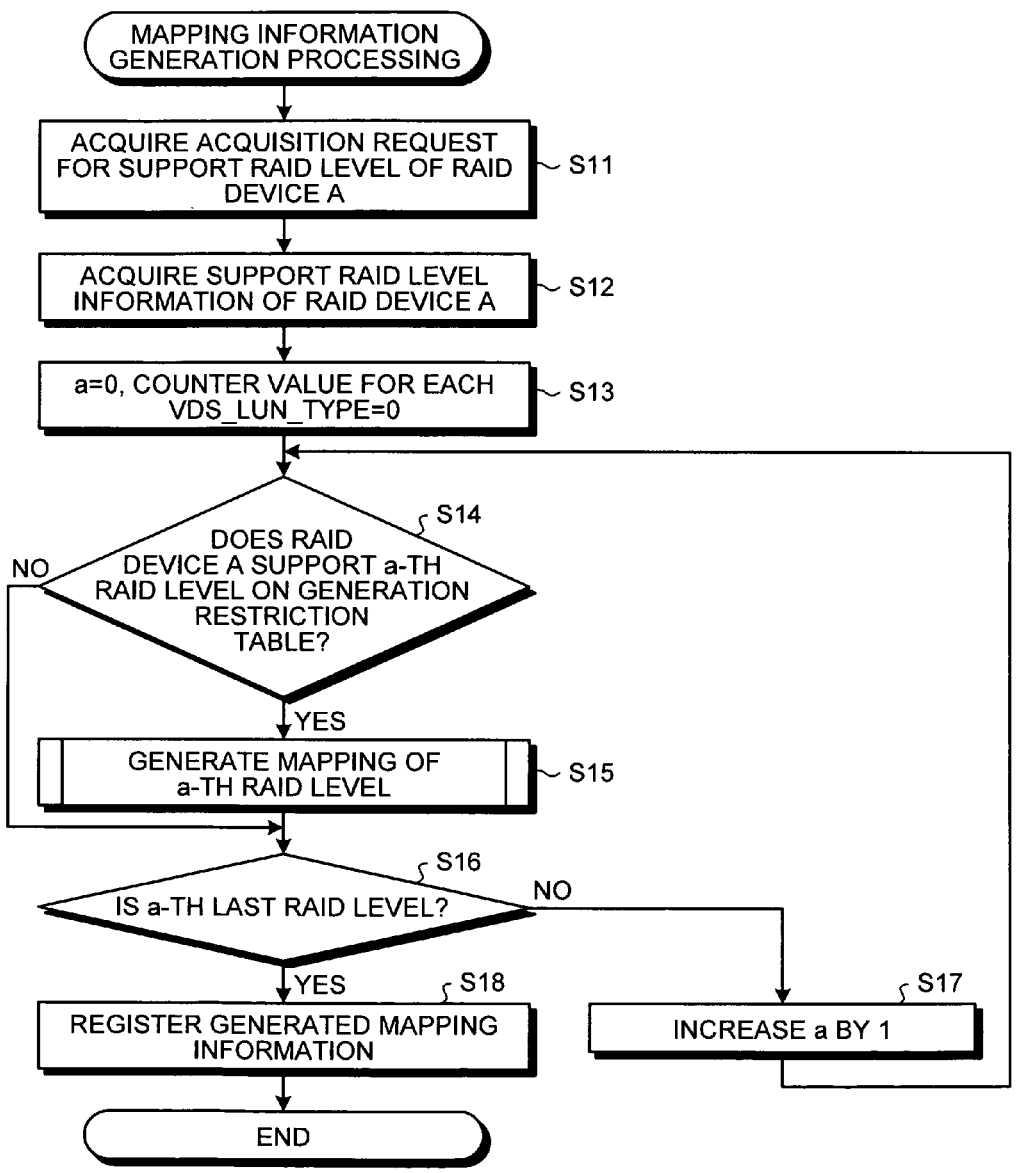
FIG. 7 is a flowchart illustrating a procedure of mapping information generation processing according to the Second embodiment.

Procedure of Mapping Information Generation Processing according to Second Embodiment Next, a procedure of mapping information generation processing according to the second embodiment will be described with reference to FIG. 7. FIG. 7 is a flowchart illustrating a procedure of mapping information generation processing according to the second embodiment. It is assumed that the user issues a request to register mapping information with the RAID device 4 as a RAID device A from the user terminal 5.

First, the mapping information generation control unit 31 acquires a request to register mapping information of a RAID device A from the user terminal 5. When this happens, the mapping information generation control unit 31 requests the support RAID level acquisition unit 41 to acquire the RAID levels which are supported by the RAID device A (S11). The mapping information generation control unit 31 acquires the RAID levels as the request result from the support RAID level acquisition unit 41 (S12).

Next, the mapping information generation control unit 31 sets an index a representing a mapping order to 0 for the RAID level 51b stored in the generation rule table 51 and also sets the counter value for each LUN type 51a to 0 (S13). For example, the value of the index a is set to 0 for RAID0 on the leftmost side of the RAID level 51b stored in the generation rule table 51 and incremented by 1 toward the right. That is, the index a is set to 0 for RAID0, 1 for RAID1, and 16 for RAID6+6.

Next, the mapping information generation control unit 31 determines whether or not the RAID device A supports the a-th RAID level 51b on the generation rule table 51 (S14). Specifically, the mapping information generation control unit 31 determines whether or not there is a RAID level which coincides with the a-th RAID level 51b from among the RAID levels acquired from the support RAID level acquisition unit 41.

When the RAID device A supports the a-th RAID level 51b (Yes in S14), the mapping information generation control unit 31 performs mapping generation processing for the a-th RAID level 51b (S15). The details of the mapping generation processing will be described below.

Meanwhile, when the RAID device A does not support the a-th RAID level 51b (No in S14), the mapping information generation control unit 31 progresses to S16. Subsequently, the mapping information generation control unit 31 determines whether or not the a-th RAID level 51b is the last RAID level (S16).

When the a-th RAID level 51b is not the last RAID level (No in S16), the mapping information generation control unit 31 increments the index a by 1 (S17). The mapping information generation control unit 31 progresses to S14 so as to process the next RAID level.

When the a-th RAID level 51b is the last RAID level (Yes in S16), the mapping information generation control unit 31 notifies the mapping information registration unit 43 of a request register mapping information. The mapping information registration unit 43 registers the mapping of the RAID levels and the LUN types generated by the mapping generation processing of the mapping information generation control unit 31 in the mapping information 52 (S18).

Figure 8:
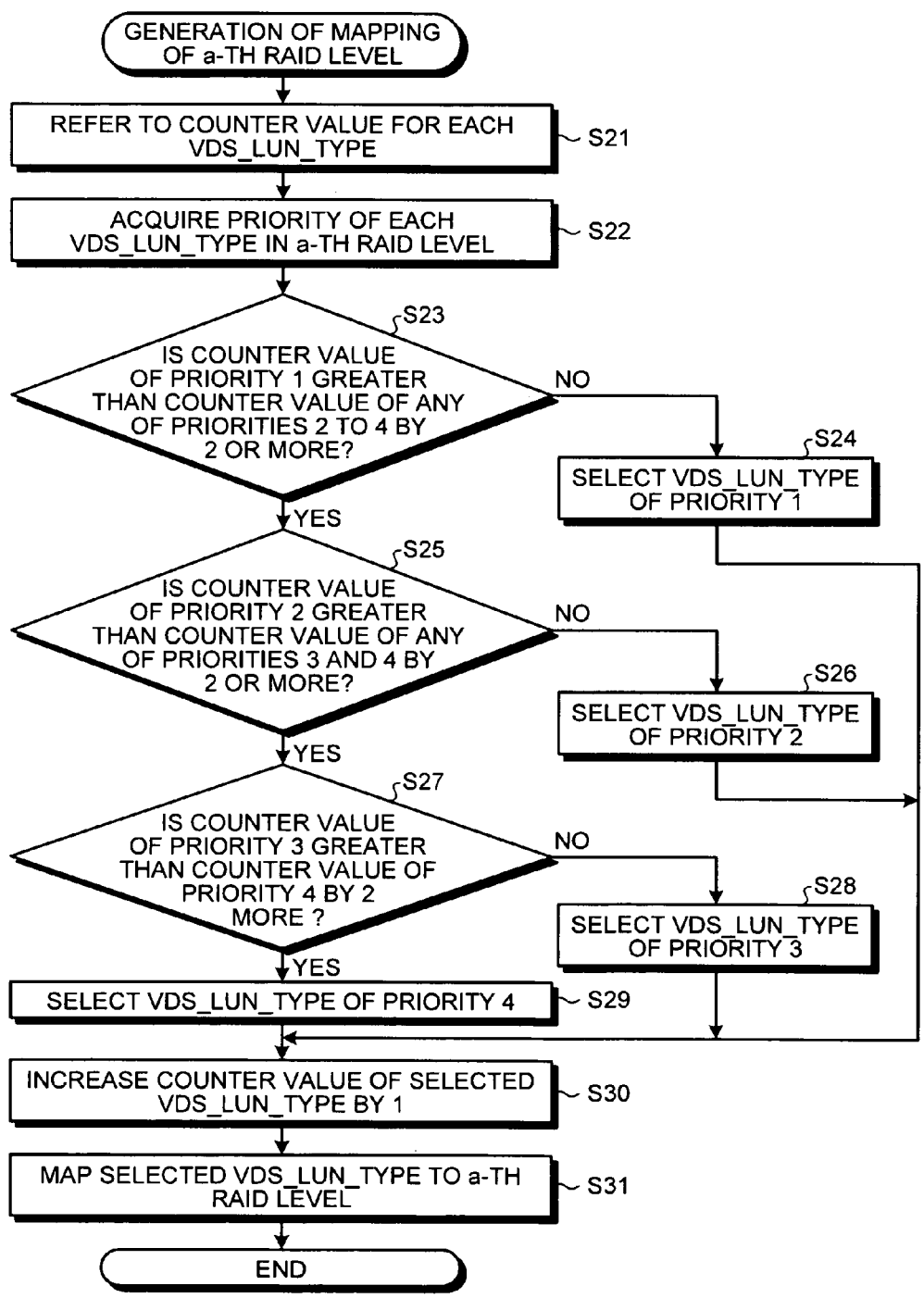
FIG. 8 is a flowchart illustrating a procedure of mapping generation processing of the a-th RAID level.

Next, the procedure of the mapping information processing (S15) illustrated in FIG. 7 will be described with reference to FIG. 8. FIG. 8 is flowchart illustrating a procedure of mapping generation processing of the a-th RAID level.

First, the mapping information generation control unit 31 references the counter value for each LUN type 51a (S21). Next, the mapping information generation control unit 31 acquires the priority 51c of each LUN type 51a in the a-th RAID level 51b of the generation rule table 51 from the generation rule table 51 (S22).

The mapping information generation control unit 31 determines whether or not the counter value corresponding to the LUN type 51a of the priority 1 is greater than the counter value corresponding to the LUN type 51a of one of the priorities 2 to 4 by equal to or greater than 2 (S23). When the counter value corresponding to the priority 1 is not greater than the counter value corresponding to one of the priorities 2 to 4 by equal to or greater than 2 (No in S23), the mapping information generation control unit 31 determines that mapping does not concentrate on the LUN type 51a of the priority 1. The mapping information generation control unit 31 selects the LUN type 51a of the priority 1 so as to map on the a-th RAID level 51b (S24) and progresses to S30.

Meanwhile, when the counter value corresponding to the priority 1 is greater than the counter value corresponding to one of the priorities 2 to 4 by equal to or greater than 2 (Yes in S23), the mapping information generation control unit 31 determines that mapping concentrates on the LUN type 51a of the priority 1. The mapping information generation control unit 31 determines whether or not the counter value corresponding to the LUN type 51a of the priority 2 is greater than the counter value corresponding to the LUN type 51a of one of the priorities 3 and 4 by equal to or greater than 2 (S25).

When the counter value corresponding to the priority 2 is not greater than the counter value corresponding to one of the priorities 3 and 4 by equal to or greater than 2 (No in S25), the mapping information generation control unit 31 determines that mapping does not concentrate on the LUN type 51a of the priority 2. The mapping information generation control unit 31 selects the LUN type 51a of the priority 2 so as to map on the a-th RAID level 51b (S26) and progresses to S30.

Meanwhile, when the counter value corresponding the priority 2 is greater than the counter value corresponding to one of the priorities 3 and 4 by equal to or greater than 2 (Yes in S25), the mapping information generation control unit 31 determines that mapping concentrates on the LUN type 51a of the priority 2. The mapping information generation control unit 31 determines whether or not the counter value corresponding to the LUN type 51a of the priority 3 is greater than the counter value corresponding to the LUN type 51a of the priority 4 by equal to or greater than 2 (S27).

When the counter value corresponding to the priority 3 is not greater than the counter value corresponding to the priority 4 by equal to or greater than 2 (No in S27), the mapping information generation control unit 31 determines that mapping does not concentrate on the LUN type 51a of the priority 3. The mapping information generation control unit 31 selects the LUN type 51a of the priority 3 so as to map on the a-th RAID level 51b (S28) and progresses to S30.

Meanwhile, when the counter value corresponding to the priority 3 is greater than the counter value corresponding to the priority 4 by equal to or greater than 2 (Yes in S27), the mapping information generation control unit 31 determines that mapping concentrates on the LUN type 51a of the priority 3. The mapping information generation control unit 31 selects the LUN type 51a of the priority 4 so as to map on the a-th RAID level 51b (S29).

Subsequently, the mapping information generation control unit 31 increments the counter value corresponding to the selected LUN type 51a by 1 (S30). The mapping information generation control unit 31 maps the selected LUN type 51a on the a-th RAID level (S31) and ends the mapping generation processing of the a-th RAID level.

Effects of Second Embodiment

According to the second embodiment, the mapping information generation control unit 31 maps a plurality of RAID levels on one LUN type. With this configuration, even when the total number of RAID levels which are supported by the RAID device 4 is greater than the total number of LUN types, the mapping information generation control unit 31 can map all the RAID levels on the LUN types in a many-to-one manner. As a result, it becomes possible for the mapping information generation control unit 31 to use all the RAID levels to be supported by the RAID device 4 by the VDS.

According to the second embodiment, the generation rule table 51 stores the LUN type defined by the VDS for each RAID level and the mapping generation rules in advance. If the request to generate mapping information of the RAID device 4 is acquired, the mapping information generation control unit 31 maps the LUN types on the RAID levels, which can be supported by the RAID device 4, with reference to the generation rule table 51. The mapping information registration unit 43 stores the correspondence relationship between the RAID levels and the LUN types mapped by the mapping information generation control unit 31 as the mapping information.

With this configuration, the mapping information generation control unit 31 maps the LUN types on the RAID levels, which can be supported by the RAID device 4, by using the mapping generation rules stored in the generation rule table 51. That is, even when the RAID levels which can be supported by each RAID device 4 are different, the mapping information generation control unit 31 can map the LUN types according to the RAID levels which can be supported by each RAID device 4, providing the mapping information of each RAID device 4. The storage system can support all the RAID levels, which can be supported by the RAID device 4, by the VDS using the LUN types stored as the mapping information in virtualizing the RAID levels of the RAID device 4.

According to the second embodiment, as the mapping generation rules which are stored in the generation rule table 51, the priority is allocated to the LUN type for each RAID level. The mapping information generation control unit 31 selects the LUN type in an ascending order of the priority allocated to the mapping generation rules for the RAID levels. The mapping information generation control unit 31 determines whether or not the number of RAID levels which have already been mapped on the selected LUN type is greater than the number of RAID levels which have already been mapped on another LUN type by equal to or greater than 2. When the number of RAID levels which have already been mapped on the selected LUN type is greater than the number of RAID levels which have already been mapped on another LUN type by equal to or greater than 2, the mapping information generation control unit 31 selects the LUN type having the next smallest value of the priority.

With this configuration, the mapping information generation control unit 31 can find early whether or not mapping concentrates on the selected LUN type. When mapping concentrates on the selected LUN type, the mapping information generation control unit 31 selects a LUN type different from the selected LUN type, suppressing mapping on the LUN type on which mapping concentrates. As a result, the mapping information generation control unit 31 can efficiently perform mapping on the LUN type.

[c] Third Embodiment

In the storage system 9 according to the second embodiment, a case has been described where the RAID levels which are supported by the RAID device 4 are mapped on the LUN types in a many-to-one manner and registered in the mapping information 52. The storage system 9 is not limited thereto, and the registered mapping information 52 may be changed.

In a third embodiment, a case will be described where the storage system 9 changes the registered mapping information 52.

Configuration of Storage System according to Third Embodiment

Figure 9:
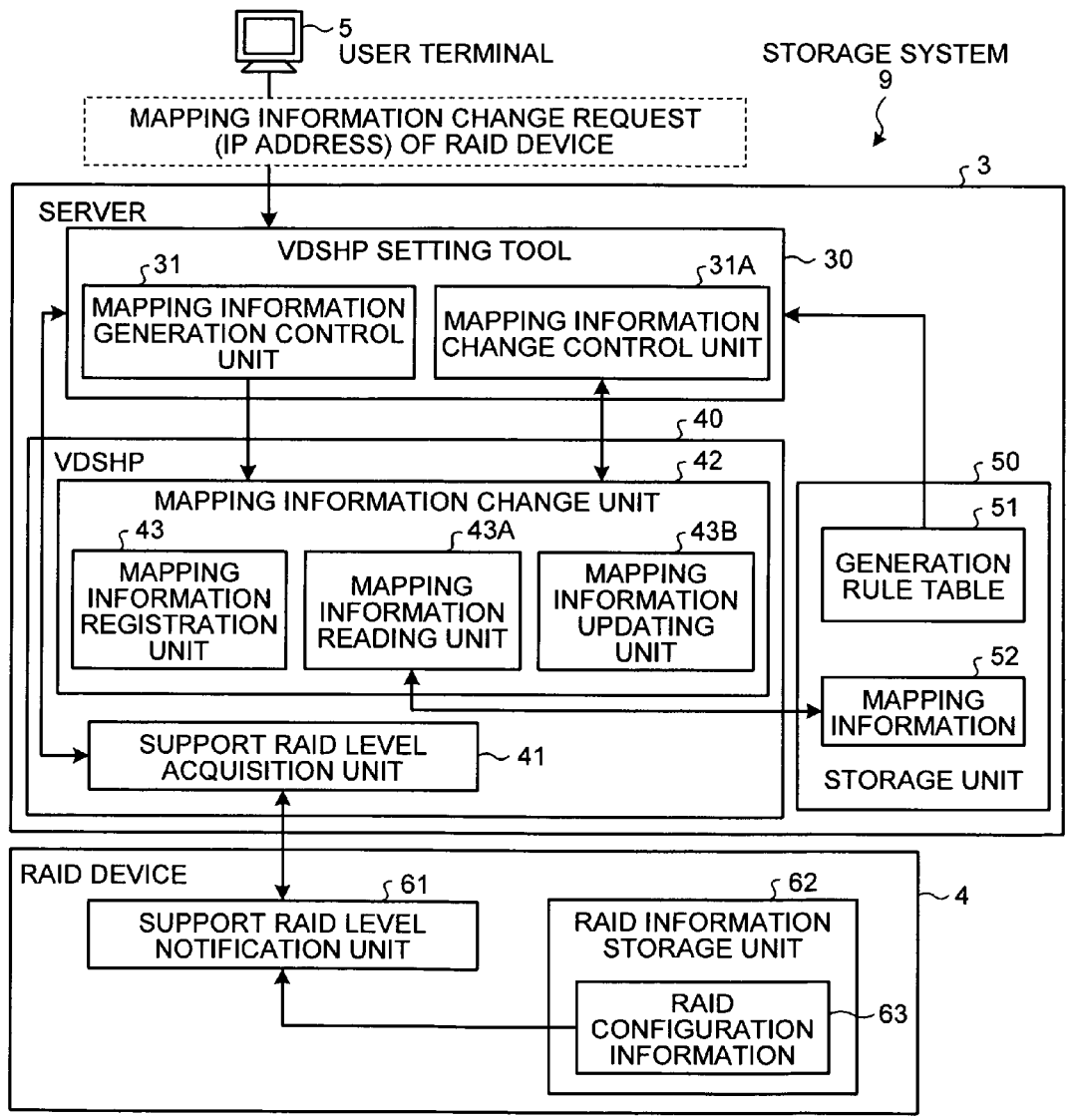
FIG. 9 is a functional block diagram illustrating the configuration of a storage system according to a third embodiment.

FIG. 9 is a functional block diagram illustrating the configuration of a storage system according to the third embodiment. The same parts as those of the storage system 9 illustrated in FIG. 2 are represented by the same reference numerals, and description of the overlapping parts and operations will be omitted. The third embodiment is different from the second embodiment in that a mapping information change control unit 31A is further provided in the VDSHP setting tool 30. The third embodiment is also different from the second embodiment in that a mapping information reading unit 43A and a mapping information updating unit 43B are further provided in the mapping information change unit 42.

The mapping information change control unit 31A updates the mapping information 52 through the mapping information change unit 42 on the basis of a change request from the user terminal 5. Specifically, the mapping information change control unit 31A requests the support RAID level acquisition unit 41 to acquire the RAID levels which are supported by the RAID device 4 and acquires the requested RAID levels from the support RAID level acquisition unit 41. The mapping information change control unit 31A requests the mapping information reading unit 43A to read the mapping information 52 and acquires the requested mapping information 52 from the mapping information reading unit 43A. The mapping information change control unit 31A displays the acquired mapping information 52 and the RAID levels, which are supported by the RAID device 4, on the user terminal 5. The mapping information change control unit 31A requests the mapping information updating unit 43B to change the mapping of the RAID levels and the LUN types changed by the user terminal 5.

If the request to read the mapping information 52 is acquired from the VDSHP setting tool 30, the mapping information reading unit 43A reads the mapping information 52 stored in the storage unit 50. The mapping information reading unit 43A outputs the read mapping information 52 to the mapping information change control unit 31A.

If the request to change the mapping is acquired from the VDSHP setting tool 30, the mapping information updating unit 43B updates the mapping information 52 to the changed mapping of the RAID levels and the LUN types.

Specific Example of Mapping Information Change

Next, a specific example of mapping information change will be described with reference to FIG. 10. FIG. 10 depicts explanatory views illustrating mapping information change. FIG. 10A illustrates mapping information before change and FIG. 10B illustrates mapping information after change.

As illustrated in FIG. 10A, in the mapping information 52, RAID1 is associated with the primary RAID level 52c corresponding to "MIRROR". RAID1+0 is associated with the primary RAID level 52c corresponding to "STRIPE", and RAID0 is associated with the secondary RAID level 52d. RAID5 is associated with the primary RAID level 52c corresponding to "PARITY". RAID6 is associated with the primary RAID level 52c corresponding to "SPAN".

Here, it is assumed that RAID1+0 is changed to the secondary RAID level 52d corresponding to "MIRROR" and RAID5+0 is added to the secondary RAID level 52d corresponding to "PARITY" by the user terminal 5. When this happens, the mapping information change control unit 31A requests the mapping information updating unit 43B to change the mapping the RAID levels and the LUN types changed by the user terminal 5. The mapping information updating unit 43B updates the mapping information 52 to the changed mapping of the RAID levels and the LUN types. As a result, as illustrated in FIG. 10B, in the mapping information 52, RAID1+0 is associated with the secondary RAID level 52d corresponding to "MIRROR". RAID0 which was in the secondary RAID level 52d after change is associated with the primary RAID level 52c corresponding to "STRIPE". RAID5+0 is associated with the secondary RAID level 52d corresponding to "PARITY".

Procedure of Mapping Information Change Processing According to Third Embodiment Next, a procedure of mapping information change processing according to the third embodiment will be described with reference to FIG. 11. FIG. 11 is a flowchart illustrating a procedure of mapping information change processing according to the third embodiment. It is assumed that the user issues a request to change mapping information with the RAID device 4 as a RAID device A from the user terminal 5.

First, the mapping information change control unit 31A acquires a request to change mapping information of the RAID device A from the user terminal 5 (S41). When this happens, the mapping information change control unit 31A requests the support RAID level acquisition unit 41 to acquire the RAID levels which are supported by the RAID device A and acquires the RAID levels as the request result from the support RAID level acquisition unit 41 (S42).

Next, the mapping information change control unit 31A requests the mapping information reading unit 43A to read the mapping information 52 of the RAID device A and acquires the requested mapping information 52 of the RAID device A from the mapping information reading unit 43A (S43). The mapping information change control unit 31A displays the mapping information 52 of the RAID device A and the RAID level, which are supported by the RAID device A, on the user terminal 5 (S44).

Thereafter, the mapping information change control unit 31A requests the mapping information updating unit 43B to change the mapping of the RAID levels of the RAID device A and the LUN types changed by the user terminal 5 in accordance with a user's operation. The mapping information updating unit 43B updates the mapping information 52 to the mapping of the RAID levels of the RAID device A and the LUN types in accordance with the user's operation content (S45).

Effects of Third Embodiment

According to the third embodiment, if the request to change the mapping information of the RAID device 4 is acquired, the mapping information change control unit 31A changes the mapping information of the RAID device 4 on the basis of the change request. With this configuration, the mapping information change control unit 31A can change the mapping information even after the mapping information of the RAID device 4 is newly created. As a result, it becomes possible for the mapping information change control unit 31A to freely change the mapping information of the RAID device 4 as the user desired. Even when a new RAID level is added to the RAID device 4, the mapping information change control unit 31A can change the mapping information in accordance with the addition of the RAID level and can support the added RAID level by the VDS.

[d] Forth Embodiment

In the storage system 9 according to the second embodiment, a case has been described where the RAID levels which are supported by the RAID device 4 are mapped on the LUN types in a many-to-one manner and registered in the mapping information 52. In the storage system 9 according to the third embodiment, a case has been described where the mapping information 52 of the RAID device 4 is changed. In a fourth embodiment, a case will be described where the storage system 9 references the registered or changed mapping information 52 and creates LUN in the RAID device 4.

Configuration of Storage System according to Fourth Embodiment

Figure 12:
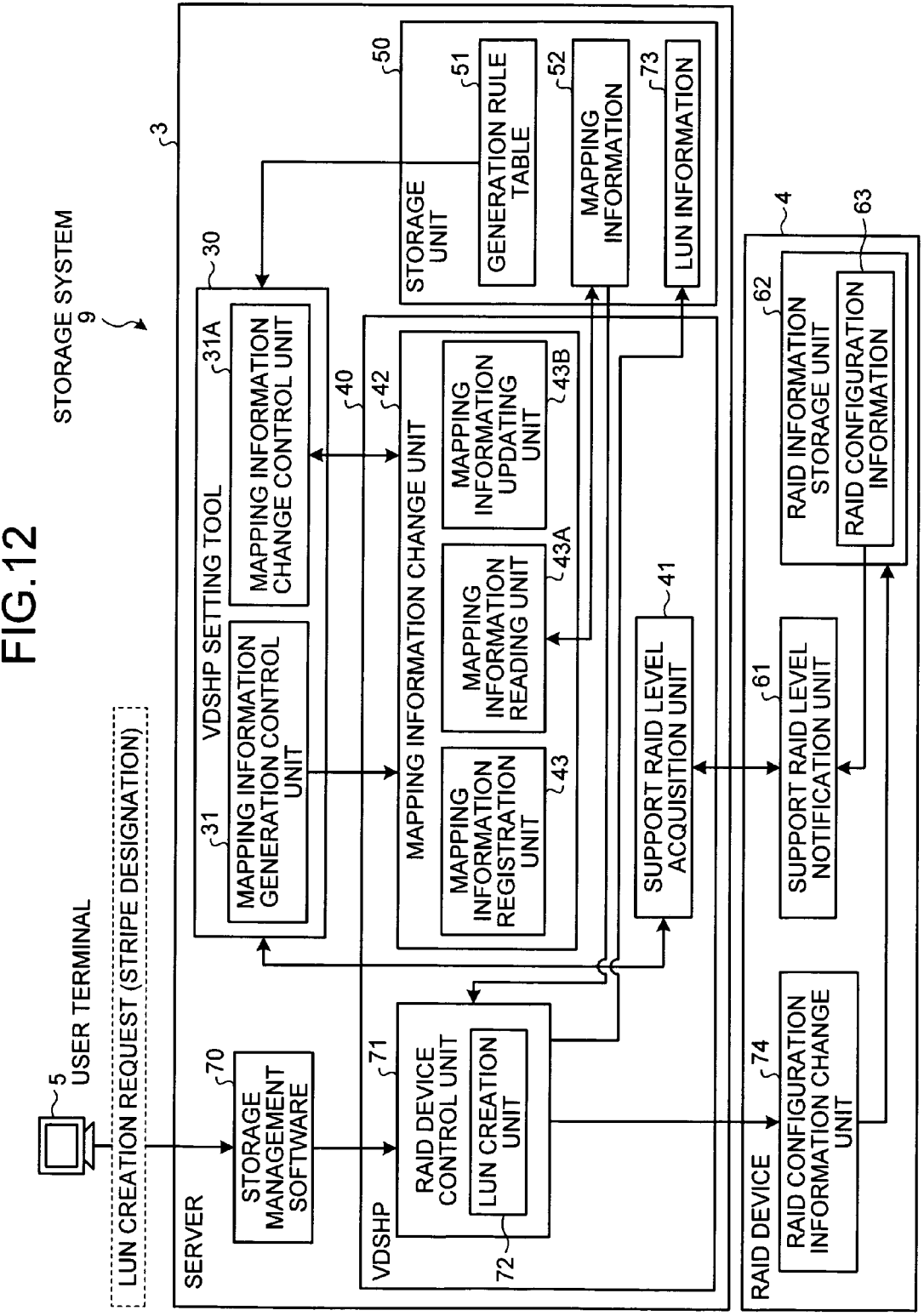
FIG. 12 is a functional block diagram illustrating the configuration of a storage system according to a fourth embodiment.

FIG. 12 is a functional block diagram illustrating the configuration of a storage system according to the fourth embodiment. The same parts as those of the storage system 9 illustrated in FIG. 9 are represented by the same reference numerals, and description of the overlapping parts and operations will be omitted. The fourth embodiment is different from the third embodiment in that storage management software 70 is further provided in the server 3 and LUN information 73 is further provided in the storage unit 50 of the server 3. There is another difference in that a RAID device control unit 71 is further provided in the VDSHP 40. The fourth embodiment is also different from the third embodiment in that a RAID configuration information change unit 74 is further provided in the RAID device 4.

The storage management software 70 is software which sets the configuration of the RAID device 4, such as LUN or affinity, by using the VDSHP 40. Specifically, the storage management software 70 notifies the RAID device control unit 71 of the VDSHP 40 of a LUN creation request with the LUN type of the RAID device 4 designated from the user terminal 5 as a parameter.

The RAID device control unit 71 controls the RAID device 4 and includes a LUN creation unit 72. The LUN creation unit 72 references the mapping information 52 and creates LUN on the RAID levels which are mapped on the LUN types of the mapping information 52. Specifically, the LUN creation unit 72 acquires the LUN creation request with the LUN type of the RAID device 4 as a parameter from the storage management software 70. The LUN creation unit 72 acquires the mapping information 52 of the RAID device 4 from the storage unit 50. The LUN creation unit 72 references the mapping information 52 and sequentially selects the RAID level of the LUN type designated as a parameter from the primary RAID levels. The LUN creation unit 72 evaluates whether or not LUN can be created on the selected RAID level and determines the evaluation result. When it is determined that LUN can be created on the selected RAID level, the LUN creation unit 72 determines the RAID level and issues a LUN creation command with the determined RAID level as a parameter to the RAID device 4. Meanwhile, when it is determined that LUN cannot be created on the selected RAID level, the LUN creation unit selects the next RAID level and evaluates possibility of LUN creation.

The LUN creation unit 72 stores information regarding LUN on the determined RAID level in the LUN information 73. For example, the LUN information 73 stores the LUN on the RAID level at least in association with the LUN type. The LUN information 73 may store the LUN size, affinity setting information, or the like for use in the application interface of the VDS in association with LUN.

If the LUN creation command issued from the LUN creation unit 72 with the RAID level as a parameter is received, the RAID configuration information change unit 74 creates LUN on the RAID level and updates the RAID configuration information 63 which is changed in accordance with the creation of LUN.

Procedure of LUN Creation Processing According to Fourth Embodiment

Figure 13:
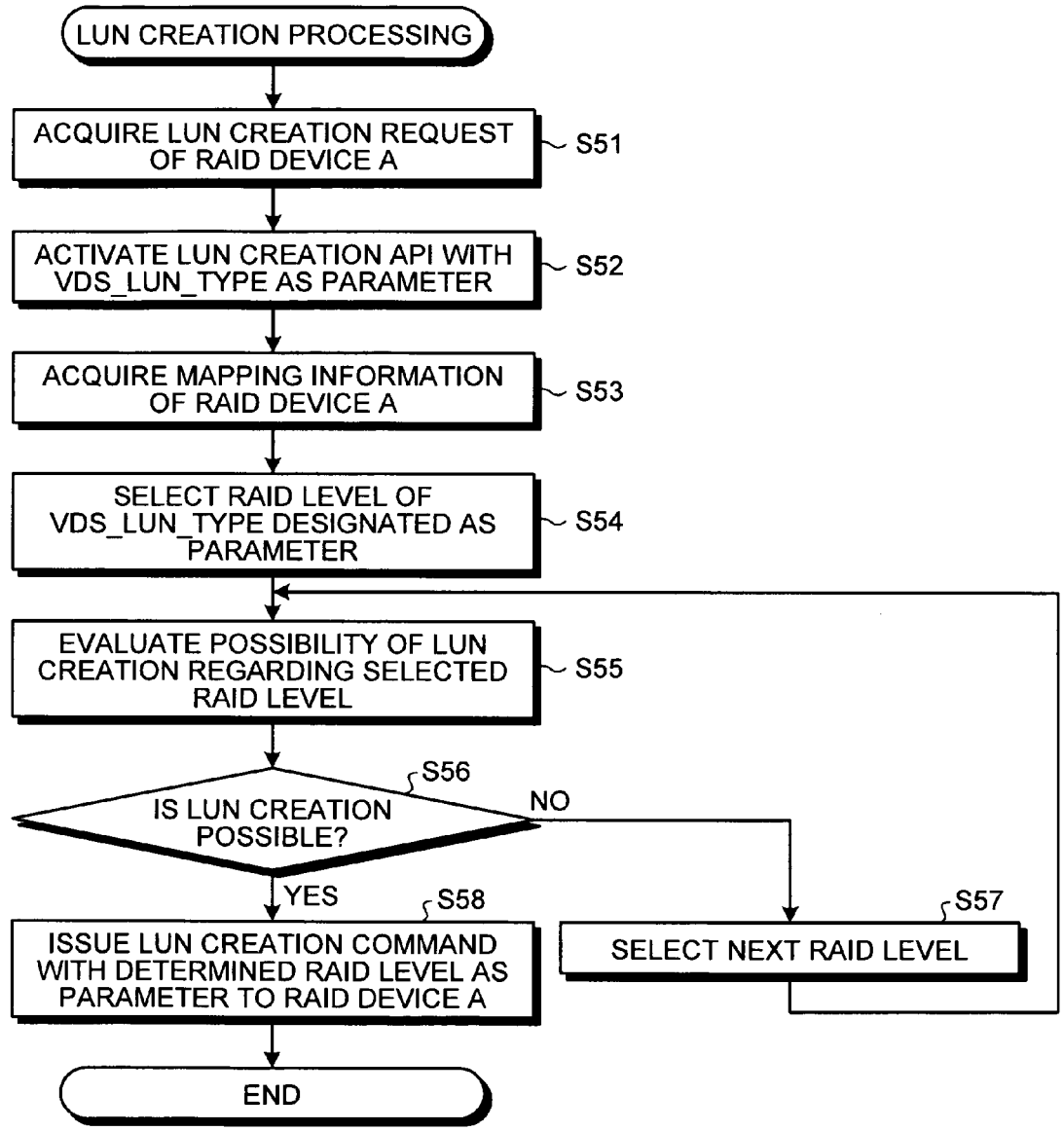
FIG. 13 is a flowchart illustrating a procedure of LUN creation processing according to the fourth embodiment.

Next, a procedure of LUN creation processing according to the fourth embodiment will be described with reference to FIG. 13. FIG. 13 is a flowchart illustrating a procedure of LUN creation processing according to the fourth embodiment. It is assumed that the user issues a LUN creation request with the RAID device 4 as a RAID device A from the user terminal 5. For convenience of description, in the mapping information 52 of the RAID device A, for example, RAID1+0 is associated with the primary RAID level 52c corresponding to the LUN type 52b "STRIPE", and RAID0 is associated with the secondary RAID level 52d.

First, the storage management software 70 acquires the LUN creation request with the LUN type of the RAID device A as a parameter from the user terminal 5 (S51). Here, it is assumed that the storage management software 70 acquires the LUN creation request with "STRIPE", which is one of the LUN types of the RAID device A, as a parameter from the user terminal 5.

When this happens, the storage management software 70 activates an LUN creation API with the LUN type as a parameter (S52). That is, the storage management software 70 notifies the LUN creation unit 72 of the LUN creation request with the LUN type as a parameter. Here, the storage management software 70 notifies the LUN creation unit 72 of the LUN creation request with "STRIPE" as a parameter.

Subsequently, the LUN creation unit 72 acquires the mapping information 52 of the RAID device 4 from the storage unit 50 (S53). The LUN creation unit 72 selects the primary RAID level of the LUN type designated as a parameter (S54). Here, the LUN creation unit 72 selects RAID1+0 which is the primary RAID level of "STRIPE" designated as a parameter.

The LUN creation unit 72 evaluates whether or not LUN can be created on the selected RAID level (S55). The LUN creation unit 72 determines whether or not LUN can be created on the selected RAID level on the basis of the evaluation result (S56). When it is determined that LUN cannot be created on the selected RAID level (No in S56), the LUN creation unit 72 selects the next RAID level (S57) and progresses to S55. Here, when LUN cannot be created on selected RAID1+0, the LUN creation unit 72 selects RAID0 which is the secondary RAID level of "STRIPE".

Meanwhile, when it is determined that LUN can be created on the selected RAID level (Yes in S56), the LUN creation unit 72 determines the selected RAID level. The LUN creation unit 72 issues the LUN creation command with the determined RAID level as a parameter to the RAID device (S58). Here, when LUN can be created on selected RAID1+0, the LUN creation unit 72 issues the LUN creation command with RAID1+0 as a parameter to the RAID device A. As a result, in the RAID device A, LUN is created on RAID1+0 by the RAID configuration information change unit 74.

Effects of Fourth Embodiment

According to the fourth embodiment, if the LUN creation request with the LUN type of the RAID device 4 designated is acquired, the LUN creation unit 72 creates LUN on the RAID level associated with the designated LUN type on the basis of the mapping information 52. With this configuration, even in the mapping information 52 in which a plurality of RAID levels are associated with one LUN type, the LUN creation unit 72 early selects the RAID level suitable for the designated LUN type, efficiently creating LUN on the selected RAID level.

[e] Fifth Embodiment

In the storage system 9 according to the third embodiment, a case has been described where the mapping information 52 in which the RAID levels which are supported by the RAID device 4 are mapped on the LUN types is changed. In the storage system 9 according to the fourth embodiment, a case has been described where the mapping information 52 is referenced, LUN is created on the RAID level of the RAID device 4, and information regarding the created LUN is stored in the LUN information 73. However, there is a case where the mapping information 52 is changed, such that the LUN type associated with the RAID level is changed. For this reason, even when LUN is the same as LUN which has already been created on the RAID level, the LUN type may be dynamically switched. Accordingly, in a fifth embodiment, a case will be described where, when the mapping information 52 is changed, the storage system 9 updates the LUN information 73.

Configuration of Storage System According to Fifth Embodiment

Figure 14:
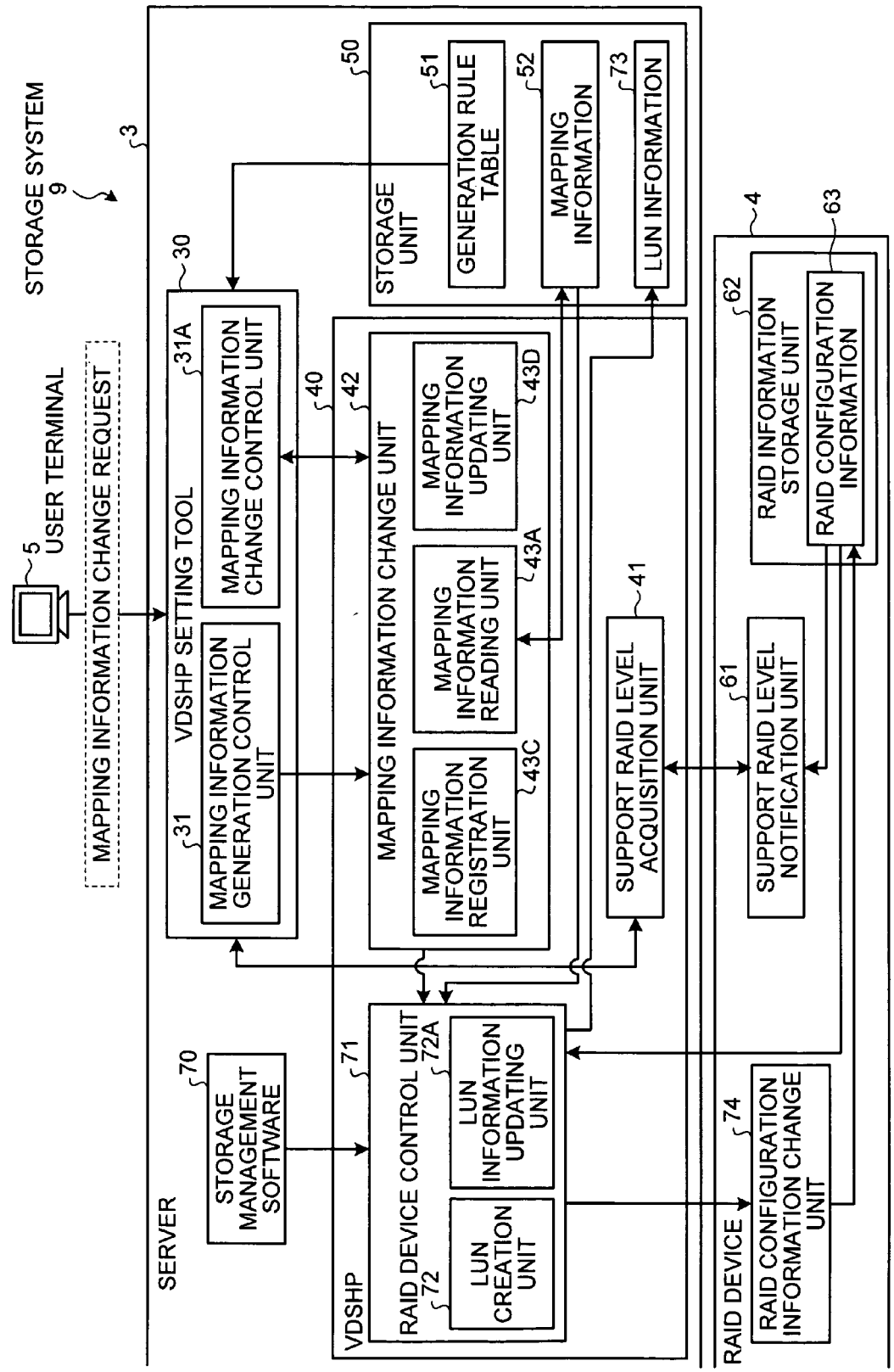
FIG. 14 is a functional block diagram illustrating the configuration of a storage system according to a fifth embodiment.

FIG. 14 is a functional block diagram illustrating the configuration of a storage system according to the fifth embodiment. The same parts as those of the storage system 9 illustrated in FIG. 12 are represented by the same reference numerals, and description of the overlapping parts and operations will be omitted. The fifth embodiment is different from the fourth embodiment in that a LUN information updating unit 72A is further provided in the RAID device control unit 71. The fifth embodiment is also different from the fourth embodiment in that the mapping information registration unit 43 is changed to a mapping information registration unit 43C, and the mapping information updating unit 43B is changed to a mapping information updating unit 43D.

If the request to register mapping information is acquired from the VDSHP setting tool 30, the mapping information registration unit 43C registers the mapping of the RAID levels and the LUN types generated by the mapping generation processing of the mapping information generation control unit 31 in the mapping information 52. If the mapping is registered in the mapping information 52, the mapping information registration unit 43 notifies the LUN information updating unit 72A that the mapping information 52 is changed.

If the request to change mapping is acquired from the VDSHP setting tool 30, the mapping information updating unit 43D updates the mapping information 52 to the changed mapping of the RAID levels and the LUN types. If the mapping information 52 is updated, the mapping information updating unit 43D notifies the LUN information updating unit 72A that the mapping information 52 is changed.

The LUN information updating unit 72A is triggered in accordance with the change of the mapping information 52, references the changed mapping information 52 of the RAID device 4, and updates the LUN information 73. Specifically, the LUN information updating unit 72A acquires the notification regarding the change of the mapping information 52 of the RAID device 4 from the mapping information change unit 42. The LUN information updating unit 72A also acquires the RAID configuration information 63 from the RAID device 4. The LUN information updating unit 72A also acquires the mapping information 52 of the RAID device 4. The LUN information updating unit 72A updates the LUN information 73 so as to coincide with the LUN type associated with the RAID level of the changed mapping information 52 on the basis of the RAID configuration information 63 and the mapping information 52.

For example, it is assumed that the LUN type of RAID0+5 of the mapping information 52 is changed from "STRIPE" to "PARITY". It is also assumed that the LUN of RAID0+5 of the RAID configuration information 63 stored in the RAID device 4 is #0, and the LUN type of LUN#0 of the LUN information is "STRIPE". At this time, the LUN information updating unit 72A acquires LUN#0 corresponding to RAID0+5 from the RAID configuration information 63. The LUN information updating unit 72A updates the LUN type "STRIPE" corresponding to LUN#0 stored in the LUN information 73 to "PARITY".

Procedure of LUN Information Updating Processing According to Fifth Embodiment

Figure 15:
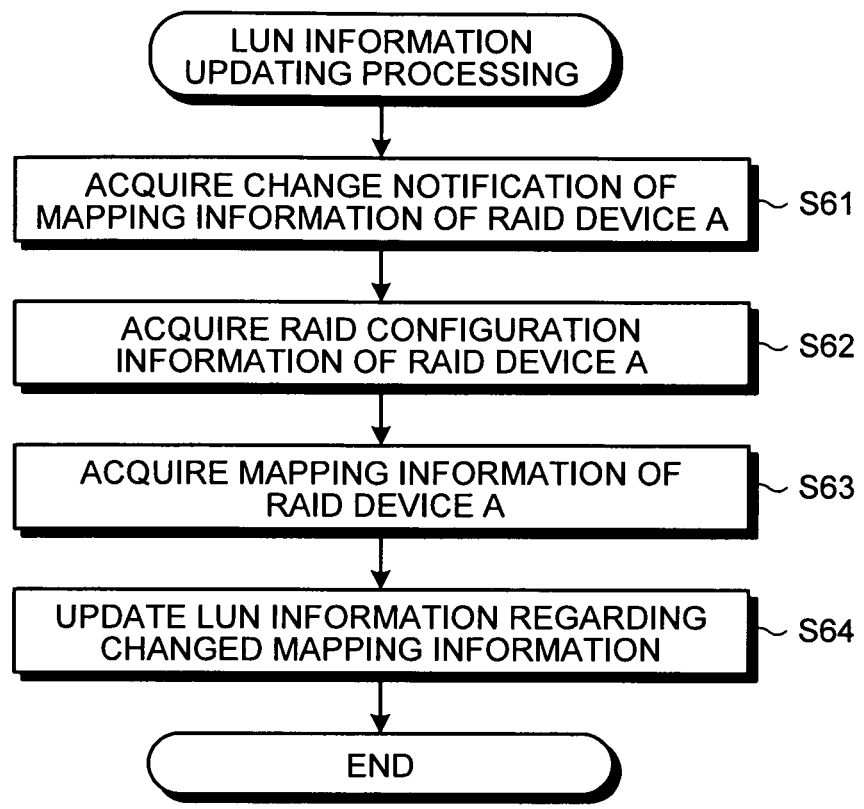
FIG. 15 is a flowchart illustrating a procedure of LUN information updating processing according to the fifth embodiment.

Next, a procedure of LUN information updating processing according to the fifth embodiment will be described with reference to FIG. 15. FIG. 15 is a flowchart illustrating a procedure of LUN information updating processing according to the fifth embodiment. It is assumed that the mapping information 52 of the RAID device A is changed by the mapping information updating unit 43D.

First, the LUN information updating unit 72A acquires the notification regarding the change of the mapping information 52 of the RAID device A from the mapping information updating unit 43D (S61). When this happens, the LUN information updating unit 72A performs communication with the RAID device A and acquires the RAID configuration information 63 from the RAID device A (S62). Next, the LUN information updating unit 72A acquires the mapping information 52 of the RAID device A from the storage unit 50 (S63).

Subsequently, the LUN information updating unit 72A updates the LUN information 73 so as to coincide with the LUN type associated with the RAID level of the changed mapping information 52 on the basis of the RAID configuration information 63 and the mapping information 52 (S64).

Effects of Fifth Embodiment

According to the fifth embodiment, the LUN information 73 stores the LUN created on the RAID level of the RAID device 4 in association with the LUN type. If the notification regarding the change of the mapping information 52 of the RAID device 4 is acquired from the mapping information change unit 42, the LUN information updating unit 72A updates the LUN information 73 so as to coincide with the LUN type associated with the RAID level of the changed mapping information 52. With this configuration, the LUN information updating unit 72A can avoid mismatching between the LUN type associated with the RAID level of the changed mapping information 52 and the LUN type associated with LUN of the LUN information 73, efficiently updating the LUN information 73.

Others

Each constituent element of each device illustrated in the drawings does not need to be physically constituted as illustrated in the drawings. That is, the specific form of distribution or integration of each device is not limited to one illustrated in the drawings, and all or a portion of the form may be functionally or physically distributed or integrated in arbitrary units depending on various loads or usage. For example, various functional units in the mapping information change unit 42 may be integrated as a single unit. Various functional units in the VDSHP setting tool 30 may be integrated as a single unit. Various functional units in the RAID device control unit 71 may be integrated as a single unit. Various functional units in the mapping information change unit 42 may be separately distributed. Various functional units in the VDSHP setting tool 30 may be separately distributed. Various functional units in the RAID device control unit 71 may be separately distributed. The storage unit 50 may be connected as an external device of the server 3 through a network.

Program

Various kinds of processing which have been described in the foregoing examples can be realized by causing a computer, such as a personal computer or a work station, to execute a program prepared in advance. Hereinafter, an example of a computer which executes a storage control program having the same function as the storage system 9 illustrated in FIG. 14 will be described with reference to FIG. 16.

Figure 16:
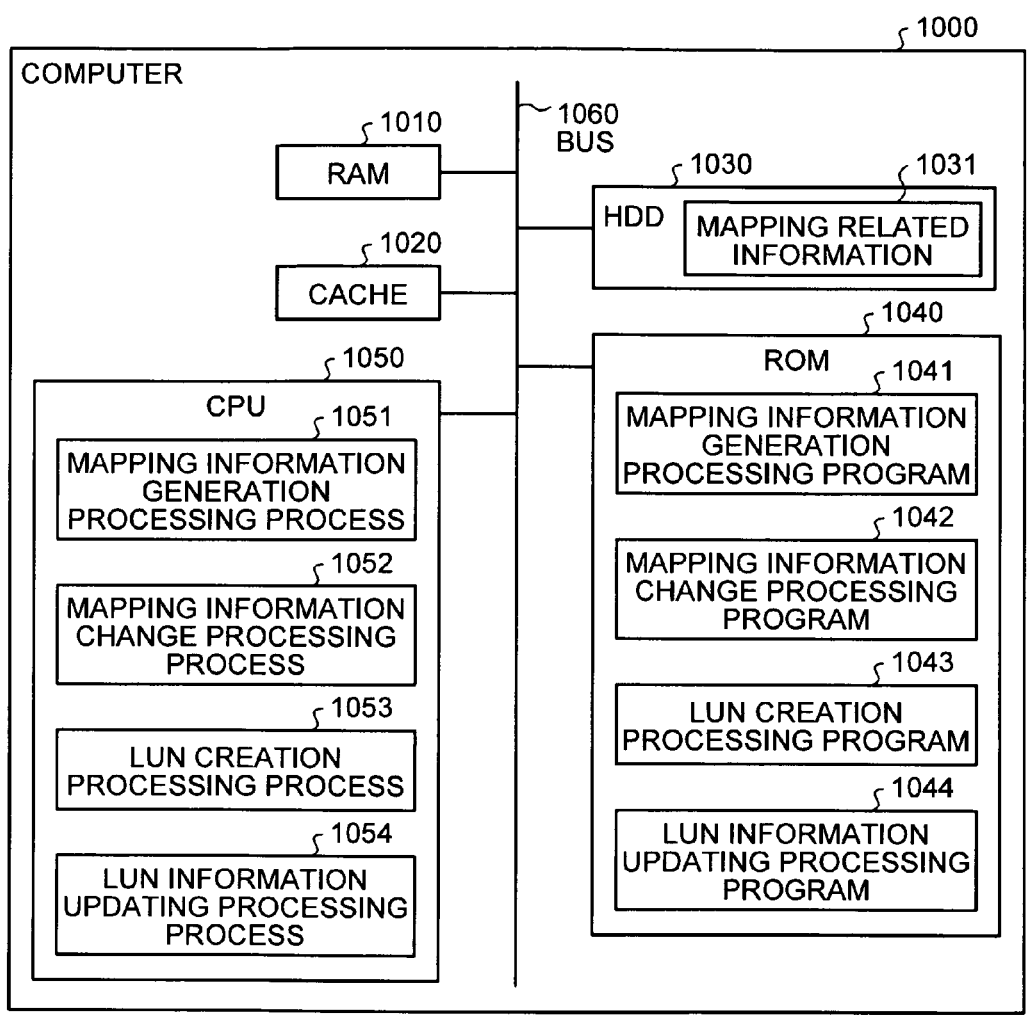
FIG. 16 is a diagram illustrating a computer which executes a storage control program.
Figure 17:
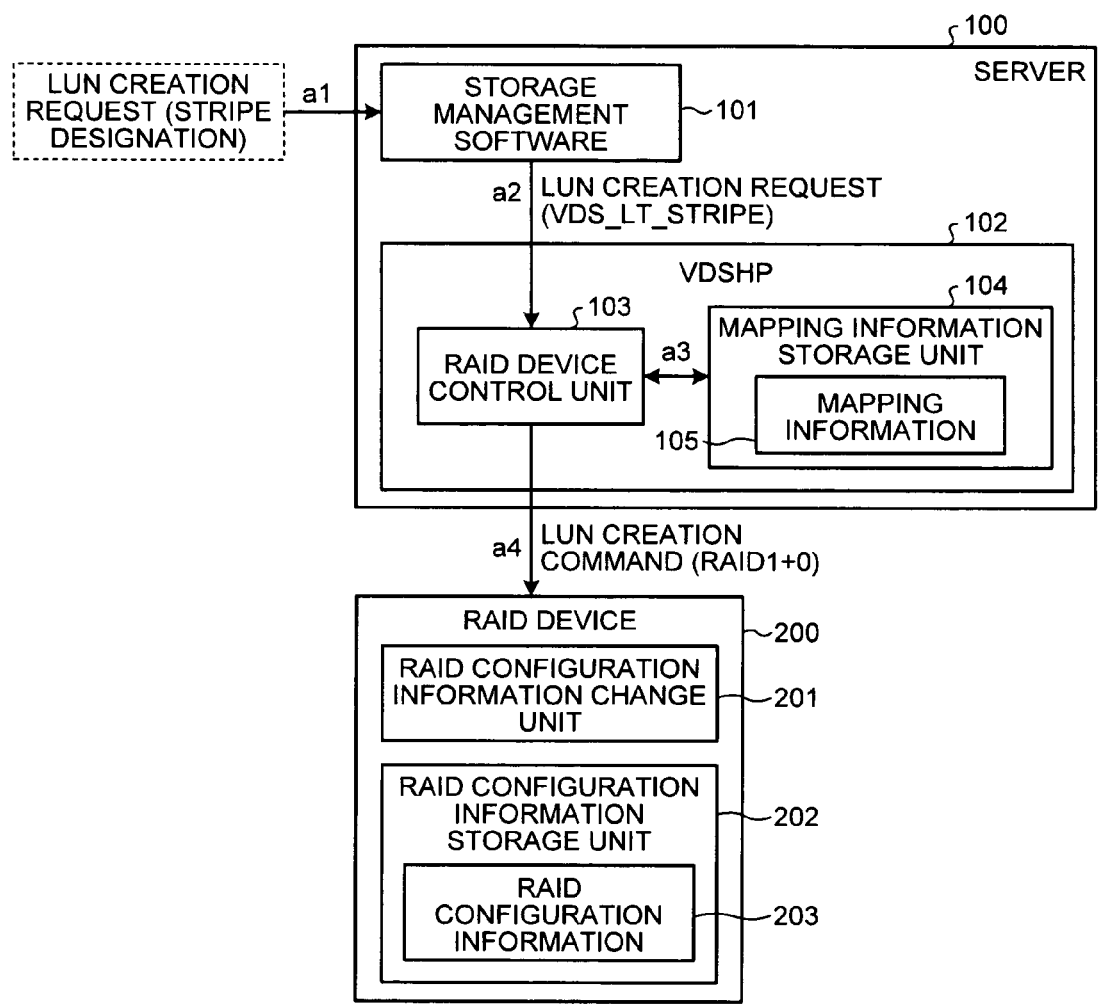
FIG. 17 is a diagram illustrating a case where stripe LUN is created in the related art.

FIG. 16 is a diagram illustrating a computer which executes a storage control program. As illustrated in FIG. 16, a computer 1000 has a Random Access Memory (RAM) 1010, a cache 1020, an HDD 1030, a Read Only Memory (ROM) 1040, a Central Processing Unit (CPU) 1050, and a bus 1060. The RAM 1010, the cache 1020, the HDD 1030, the ROM 1040, and the CPU 1050 are connected to each other through the bus 1060.

The ROM 1040 stores a storage control program, which has the same function as the storage system 9 illustrated in FIG. 14, in advance. Specifically, the storage control program includes a mapping information generation processing program 1041, a mapping information change processing program 1042, a LUN creation processing program 1043, and a LUN information updating processing program 1044.

The CPU 1050 reads the storage control program from the ROM 1040 and executes the storage control program. Thus, as illustrated in FIG. 16, the storage control program becomes a storage control process. Specifically, the storage control process includes a mapping information generation processing process 1051, a mapping information change processing process 1052, a LUN creation processing process 1053, and a LUN information updating processing process 1054. The storage control process corresponds to the VDSHP setting tool 30, the VDSHP 40, the storage management software 70, the RAID configuration information change unit 74, and the support RAID level notification unit 61 illustrated in FIG. 14.

As illustrated in FIG. 16, the HDD 1030 is provided with mapping related information 1031. The mapping related information 1031 corresponds to, for example, various kinds of data (the generation rule table 51, the mapping information 52, and the LUN information 73) stored in the storage unit 50 and the RAID configuration information 63 stored in the RAID information storage unit 62 illustrated in FIG. 14.

The above-described programs 1041 to 1044 may not be stored in the ROM 1040. For example, the program 1041 may be stored in a portable physical medium, such as a flexible disk (FD), a CD-ROM, a MO disk, a DVD disk, a magnetooptical disk, or an IC card, which is inserted into the computer 1000. The program 1041 may be stored in a fixed physical medium, such as a hard disk drive (HDD) which is provided inside or outside the computer 1000. The program may be stored in another computer (or server) which is connected to the computer 1000 through a public line, Internet, a LAN, or a WAN. The computer 1000 may read each program from the above-described flexible disk or the like and may execute the program.

According to one aspect of the storage control program described herein, the RAID levels which can be supported by the storage device can be expanded by the storage virtualization function in the host device and supported.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-readable, non-transitory medium storing a storage control program causing a computer to execute a process comprising:
acquiring RAID levels, supportable by a storage device including a plurality of storage mediums, from the storage device;
selecting a function type of a storage virtualization function in a host device accessing the storage device on the respective acquired RAID levels in a numerically ascending order of priority allocated to mapping generation rules for the acquired RAID levels, the mapping generation rules being used to map the function types to the respective RAID levels and allocating priority to the function type for each RAID level;
determining whether or not a number of RAID levels which have already been mapped to the selected function type is greater than a number of RAID levels which have already been mapped to another function type by equal to or greater than a predetermined number;
selecting, when the number of RAID levels which have already been mapped to the selected function type is greater than the number of RAID levels which have already been mapped to another function type by the predetermined number or more, the function type of the next smallest value priority to perform the determining;
mapping, when the number of RAID levels which have already been mapped to the selected function type is less than the number of RAID levels which have already been mapped to another function type by the predetermined number, the selected function type to the RAID levels, and incrementing a counter value corresponding to the selected function type; and
storing correspondence relationships between the RAID levels and the mapped function types as mapping information.

2. The computer-readable, non-transitory medium according to claim 1, wherein the mapping includes mapping a plurality of RAID levels to one function type.

3. The computer-readable, non-transitory medium according to claim 1, wherein, if a request to generate mapping information of the storage device is acquired, the mapping of the function types to the RAID levels, supportable by the storage device, is performed with reference to a generation rule storage unit which stores mapping generation rules of the respective RAID levels and the function types.

4. A computer-readable, non-transitory medium storing a storage control program causing a computer to execute a process comprising:
acquiring RAID levels, supportable by a storage device including a plurality of storage mediums, from the storage device;
selecting a function type in a numerically ascending order of priority allocated to the mapping generation rules for the acquired RAID levels, the mapping generation rules being used to map the function types on the respective RAID levels and allocating priority to the function type for each RAID level;
determining whether or not a number of RAID levels which have already been mapped to the selected function type is greater than a number of RAID levels which have already been mapped to another function type by equal to or greater than a predetermined number;
selecting, when the number of RAID levels which have already been mapped to the selected function type is greater than the number of RAID levels which have already been mapped to another function type by the predetermined number or more, the function type of the next smallest value priority to perform the determining;
and mapping, when the number of RAID levels which have already been mapped on the selected function type is less than the number of RAID levels which have already been mapped to another function type by the predetermined number or more, the selected function type to the RAID levels, and incrementing a counter value corresponding to the selected function type.

5. The computer-readable, non-transitory medium according to claim 1, wherein the process further comprises changing, if a request to change mapping information of the storage device is acquired, the mapping information based on the change request.

6. The computer-readable, non-transitory medium according to claim 1, wherein the process further comprises creating, if a function type is designated and a request to create a virtual medium of the storage device is acquired, a virtual medium in the RAID level associated with the designated function type.

7. The computer-readable, non-transitory medium according to claim 5, wherein the process further comprises updating, if the mapping information is changed at the mapping, a virtual medium information storage unit storing virtual medium information in association with an identifier of a virtual medium created in the RAID level and the function types so as to coincide with the function types associated with the RAID levels of the changed mapping information.

8. A storage system comprising:
a storage device that includes a plurality of storage mediums; and
a host device that accesses the storage device, wherein the host device includes
a RAID level acquisition unit that acquires RAID levels supportable by the storage device from the storage device;
a determining unit that determines whether or not a number of RAID levels which have already been mapped to the selected function type is greater than a number of RAID levels which have already been mapped to another function type by equal to or greater than a predetermined number;
a selection unit that, when the number of RAID levels which have already been mapped to the selected function type is greater than the number of RAID levels which have already been mapped to another function type by the predetermined number or more, selects the function type of the next smallest value priority to perform the determining;
a mapping unit that, when the number of RAID levels which have already been mapped to the selected function type is less than the number of RAID levels which have already been mapped to another function type by the predetermined number, maps the selected function type to the RAID levels, and increments a counter value corresponding to the selected function type; and
a mapping information storage unit that stores correspondence relationships between the RAID levels and the function types mapped by the mapping unit as mapping information.

9. A storage control method for allowing a host device to control a storage device including a plurality of storage mediums, the storage control method comprising:

acquiring RAID levels supportable by the storage device from the storage device;

selecting a function type of a storage virtualization function in a host device accessing the storage device on the respective acquired RAID levels in a numerically ascending order of priority allocated to mapping generation rules for the acquired RAID levels, the mapping generation rules used to map the function types to the respective RAID levels and allocating priority to the function type for each RAID level;

determining whether or not a number of RAID levels which have already been mapped to the selected function type is greater than a number of RAID levels which have already been mapped to another function type by equal to or greater than a predetermined number;

selecting, when the number of RAID levels which have already been mapped to the selected function type is greater than the number of RAID levels which have already been mapped to another function type by the predetermined number or more, the function type of the next smallest value priority to perform the determining;

mapping, when the number of RAID levels which have already been mapped to the selected function type is less than the number of RAID levels which have already been mapped to another function type by the predetermined number, the selected function type to the RAID levels; and storing correspondence relationships between the RAID levels and the mapped function types as mapping information.

* * * * *

UNITED STATES PATENT AND TRADEMARK OFFICE
CERTIFICATE OF CORRECTION

PATENT NO. : 8,631,201 B2
APPLICATION NO. : 13/064421
DATED : January 14, 2014
INVENTOR(S) : Koshiyama Page 1 of 1

It is certified that error appears in the above-identified patent and that said Letters Patent is hereby corrected as shown below:

In the Claims

In Column 19, Line 58, In Claim 4, after "to" delete "the".

Signed and Sealed this
Twenty-ninth Day of April, 2014

Michelle K. Lee
*Deputy Director of the United States Patent and Trademark Office*